United States Patent
Yoo

(10) Patent No.: US 10,273,590 B2
(45) Date of Patent: Apr. 30, 2019

(54) COATING METHOD FOR CLAD STEEL AND COATING SOLUTION FOR COATING CLAD STEEL

(71) Applicants: Hyundai Motor Company, Seoul (KR); Kia Motors Corporation, Seoul (KR)

(72) Inventor: Chang Yeol Yoo, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 182 days.

(21) Appl. No.: 15/286,437

(22) Filed: Oct. 5, 2016

(65) Prior Publication Data

US 2017/0335480 A1 Nov. 23, 2017

(30) Foreign Application Priority Data

May 20, 2016 (KR) .......................... 10-2016-0061891

(51) Int. Cl.
*C25D 5/36* (2006.01)
*C08K 3/22* (2006.01)
(Continued)

(52) U.S. Cl.
CPC .................. *C25D 5/36* (2013.01); *C08K 3/22* (2013.01); *C09D 5/084* (2013.01); *C09D 133/00* (2013.01); *C09D 163/00* (2013.01); *C23F 1/28* (2013.01); *C23F 1/36* (2013.01); *C23F 1/40* (2013.01); *C25D 7/00* (2013.01); *C25D 9/02* (2013.01); *C25D 9/10* (2013.01); *C25D 13/12* (2013.01); *C25D 13/20* (2013.01); *C25D 13/22* (2013.01); *C25F 1/00* (2013.01); *C08K 2003/2241* (2013.01)

(58) Field of Classification Search
CPC ... C25D 5/36; C25D 7/00; C25D 9/02; C25D 9/10; C25D 13/12; C25D 13/20; C25D 13/22; C25D 13/00; C25D 13/06; C25D 13/10; C08K 3/22; C08K 2003/2241; C09D 5/084; C09D 133/00; C09D 5/44; C09D 163/00; C09D 5/08; C09D 175/04; C23F 1/28; C23F 1/36; C23F 1/40; C25F 1/00
See application file for complete search history.

(56) References Cited

U.S. PATENT DOCUMENTS

| | | | |
|---|---|---|---|
| 6,531,043 B1* | 3/2003 | Palaika | C25D 13/00 204/484 |
| 2017/0158864 A1* | 6/2017 | Olson | C09D 4/00 |
| 2017/0158882 A1* | 6/2017 | Inbe | C09D 5/08 |

FOREIGN PATENT DOCUMENTS

| | | |
|---|---|---|
| JP | 5-245438 A | 9/1993 |
| JP | 2000-281943 A | 10/2000 |

(Continued)

*Primary Examiner* — Xiuyu Tai
(74) *Attorney, Agent, or Firm* — Morgan, Lewis & Bockius LLP

(57) ABSTRACT

A coating method for a clad steel in which stainless sheets are combined on adjacent surfaces of an aluminum sheet may include preparing the clad steel, preparing a coating solution in which an epoxy resin and titanium dioxide ($TiO_2$) powder are combined in an acrylic resin, etching the clad steel to improve adhesion property between the coating solution and the clad steel, heating the clad steel, and performing electrodeposition by immersing the clad steel in the coating solution.

7 Claims, 4 Drawing Sheets

(51) Int. Cl.
*C09D 163/00* (2006.01)
*C23F 1/28* (2006.01)
*C25D 7/00* (2006.01)
*C25D 9/02* (2006.01)
*C25D 9/10* (2006.01)
*C25F 1/00* (2006.01)
*C09D 5/08* (2006.01)
*C09D 133/00* (2006.01)
*C25D 13/12* (2006.01)
*C25D 13/20* (2006.01)
*C25D 13/22* (2006.01)
*C23F 1/36* (2006.01)
*C23F 1/40* (2006.01)

(56) References Cited

FOREIGN PATENT DOCUMENTS

| | | |
|---|---|---|
| JP | 2008-42014 A | 2/2008 |
| JP | 2009-235350 A | 10/2009 |
| JP | 2012-31348 A | 2/2012 |
| KR | 10-1142268 B1 | 5/2012 |
| KR | 10-2013-0071133 A | 6/2013 |
| KR | 10-1399989 B1 | 6/2014 |
| KR | 10-2015-0065548 A | 6/2015 |
| KR | 10-2016-0023727 A | 3/2016 |

* cited by examiner

COATING METHOD FOR CLAD STEEL AND COATING SOLUTION FOR COATING CLAD STEEL

CROSS REFERENCE TO RELATED APPLICATION

The present application claims priority to Korean Patent Application No. 10-2016-0061891, filed May 20, 2016, the entire contents of which is incorporated herein for all purposes by this reference.

BACKGROUND OF THE INVENTION

Field of the Invention

The present invention relates to a coating method for clad steel and a coating solution for coating the clad steel, and more specifically, to a coating method for clad steel which coats the clad steel including stainless steel and aluminum, and a coating solution for coating the clad steel.

Description of Related Art

Conventional car door steps have generally been mainly made of stainless steel (1) according to the related art, in which a nano ceramic coating material 2 has been roll-coated thereon to prevent corrosion, as illustrated in FIG. 1.

Nano ceramic coating according to the related art has some degree of effect in view of scratch resistance; however, it carries a problem in that durability is not sufficient in corrosion environment.

Meanwhile, in accordance with a recent trend of making vehicles more lightweight, attempts have been made to change the material of the car door step into a stainless steel-aluminum clad material.

More specifically, a clad steel 10 having a three stage structure in which aluminum which is a base material 11 is positioned in the center, and stainless steels which are clad materials 12 are positioned on both surfaces of the aluminum, is manufactured as illustrated in FIG. 2, such that lightweight-ness may be implemented through the aluminum base material 11, and corrosion resistance, processibility, etc., may be improved through the stainless steel clad materials 12 disposed on both surfaces.

However, when roll-coating as used in the related art is applied to the clad steel, there is a problem in that a bi-material interface of a clad bonding part is not coated but directly exposed.

When the bi-material bonding part is exposed to the outside as described above, rigidity and lifespan may be deteriorated due to galvanic corrosion, etc.

Therefore, a coating material and a coating method capable of improving corrosion resistance and scratch resistance of the clad steel, and a method for improving bonding force between the coating material and the clad steel are necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coating method for clad steel which is suitable for clad steel including aluminum and stainless steel, and a coating solution for coating the clad steel.

According to various aspects of the presentr invention, a coating method for a clad steel in which stainless sheets are combined on adjacent surfaces of an aluminum sheet, may include preparing the clad steel, preparing a coating solution in which an epoxy resin and titanium dioxide ($TiO_2$) powder are combined in an acrylic resin, etching the clad steel to improve adhesion property between the coating solution and the clad steel, heating the clad steel, and performing electrodeposition by immersing the clad steel in the coating solution.

In the preparing of the coating solution, the coating solution may be prepared including in percent by weight (wt %), acrylic resin of 40 to 50%, $TiO_2$ of 10 to 15%, epoxy resin of 10 to 15%, melamine curing agent of 10 to 20%, aromatic solvent of 5 to 10%, and cyclohexanone of 10 to 15%.

The coating method may further include degreasing the clad steel between the preparing of the clad steel and the etching of the clad steel.

In the degreasing of the clad steel, the clad steel may be cathodically degreased in 25 to 35 g/l of trisodium phosphate ($Na_3PO_4$) aqueous solution for a time period of 30 seconds to 3 minutes under conditions in which a current density is 1 to 4 A/dm and a voltage is 4 to 6V.

In the etching of the clad steel, the clad steel may be immersed in an aqueous solution including 100 to 200 g/l of ammonium hydroxide ($NH_4OH$) and 50 to 200 g/l of potassium hydrogen phthalate (KHP) for 3 to 5 minutes to be etched, and a temperature at the time of the etching may be 20 to 30° C.

In the heating of the clad steel, the clad steel may be heated at 100 to 200° C. for a time period of 2 to 3 minutes.

In the performing of the electrodeposition, the clad steel may be immersed in the coating solution, and then, a voltage of 10 to 20V may be applied at 40 to 50° C. for a time period of 1 to 5 minutes to electrodeposit the coating solution on the clad steel.

The coating method may further include drying at 80 to 100° C. for 10 to 20 minutes after the performing of the electrodeposition.

According to various aspects of the present invention, a coating solution for coating a clad steel may include in percent by weight (wt %), acrylic resin of 40 to 50%, $TiO_2$ of 10 to 15%, epoxy resin of 10 to 15%, melamine curing agent of 10 to 20%, aromatic solvent of 5 to 10%, and cyclohexanone of 10 to 15%.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following

Figure 1:
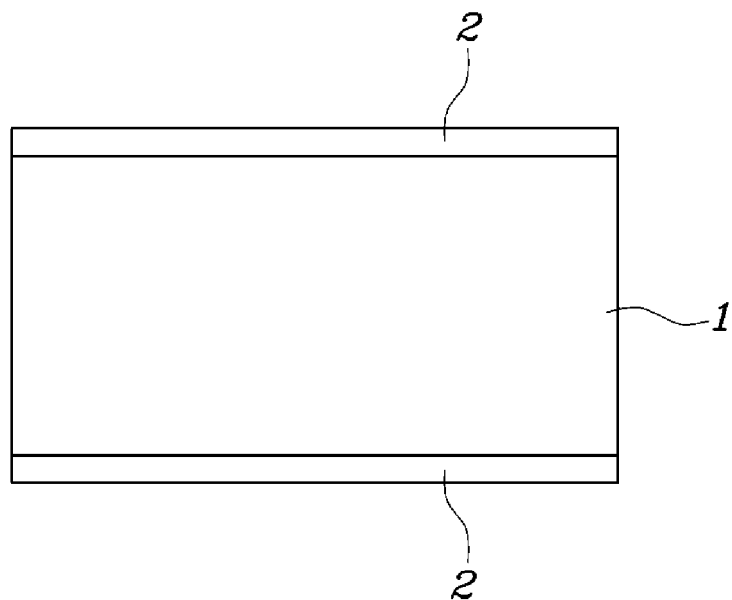
FIG. 1 is a view illustrating a nano ceramic-coated stainless steel according to the related art.
Figure 2:
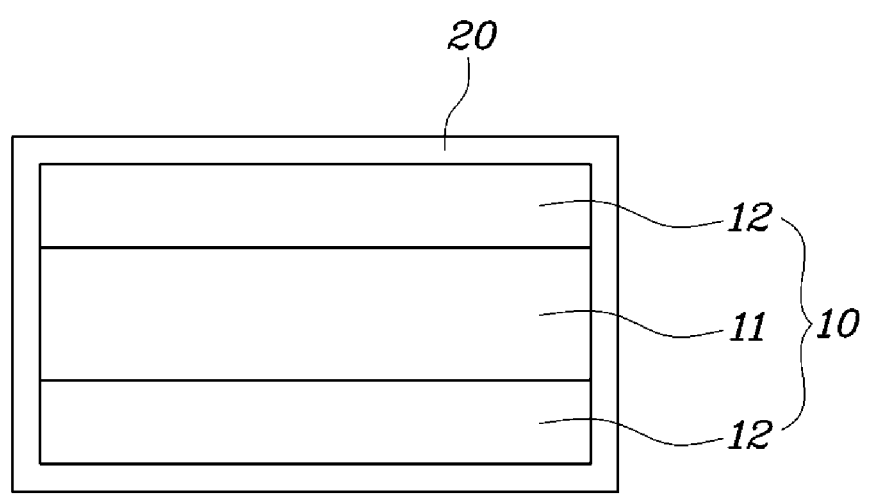
FIG. 2 is a view illustrating a clad steel coated by electrodeposition according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The coating method for clad steel according to various embodiments of the present invention is a method for forming a coating layer that provides corrosion resistance to the clad steel in which stainless sheets are combined on both surfaces of an aluminum sheet.

Specifically, the coating method may include preparing the clad steel, preparing a coating solution in which an epoxy resin and titanium dioxide ($TiO_2$) powder are added in an acrylic resin, etching the clad steel so as to improve adhesion property between the coating solution and the clad steel, heating the clad steel, and performing electrodeposition by immersing the clad steel in the coating solution.

Further, the coating method may further include degreasing the clad steel, between the preparing of the clad steel and the etching of the clad steel, and drying at 80 to 100° C. for 10 to 20 minutes after the performing of the electrodeposition.

The preparing of the clad steel is a step of preparing the clad steel by attaching stainless steel clad materials on both surfaces of an aluminum base material, in which the base material may be an A3003 aluminum alloy, and the clad steel may be SUS 304 stainless steel.

Accordingly, it is possible to manufacture a more lightweight component as compared to a case only using the SUS 304 stainless steel.

However, a bonding interface of the clad material in which different materials are combined is exposed to a side surface, which is relatively vulnerable to corrosion, and when a general roll-coating method is used for coating, a problem that only the clad material is coated, but an exposed surface of the base material in the center is not coated may occur.

Accordingly, it is required to perform coating in an immersion electrodeposition manner capable of coating entire surfaces of the clad steel, and a detailed description thereof is provided below.

Meanwhile, in the preparing of the coating solution, the coating solution is prepared, the coating solution may include in percentage by weight (wt %), acrylic resin of 40 to 50%, $TiO_2$ of 10 to 15%, epoxy resin of 10 to 15%, melamine curing agent of 10 to 20%, aromatic solvent of 5 to 10%, and cyclohexanone of 10 to 15%.

The acrylic resin is a component functioning as a core of the coating solution. When a content of the acrylic resin is insufficient, dispersibility of other components is deteriorated, such that coating hardness is deteriorated. On the contrary, when the content of the acrylic resin is excessively large, an effect of improving corrosion resistance and hardness which is exhibited by the epoxy resin and $TiO_2$ is deteriorated. Therefore, it is exemplary to limit the weight content of the acrylic resin to 40 to 50%.

The cyclohexanone and the aromatic solvent are solvents for assisting well-mixing with other components, wherein when contents of the cyclohexanone and the aromatic solvent are less than the lowest limit, the solvents may not be acted as a solvent. On the contrary, when the contents thereof are more than the upper limit, a viscosity of the coating solution is deteriorated, and coating quality is reduced due to a kind of water drop forming phenomenon. Therefore, the weight content of the cyclohexanone is preferably 10 to 15%, and the weight content of the aromatic solvent is preferably 5 to 10%, respectively.

The melamine curing agent functions as a bridge between the respective components. When an addition amount of melamine is insufficient, curing degree and crosslinking degree are not sufficient, and when the addition amount thereof is excessive, it is brittle for the entire coating. Therefore, it is exemplary to limit the weight content of the melamine to 10 to 20%.

$TiO_2$ is a material added to secure scratch resistance. When an addition amount thereof is insufficient, target hardness is not capable of being achieved, and when the addition amount thereof is excessive, the coating is excessively strong, such that attachment property and formability are reduced. Therefore, it is exemplary to limit the weight content of $TiO_2$ to 10 to 15%.

The epoxy resin is a material added to disperse $TiO_2$. When an addition amount thereof is insufficient, dispersibility of $TiO_2$ is deteriorated, it is not possible to achieve coating in uniform quality. On the contrary, when the addition amount thereof is excessive, attachment property and formability are reduced. Therefore, it is exemplary to limit the weight content of the epoxy resin to 10 to 15%.

In addition to these components, the coating solution may further include dye for expressing colors and various additives for improving workability, in total weight percentage of 1 to 5%.

Coating hardness which is changed depending on the content of $TiO_2$ is shown in Table 1 below.

TABLE 1

| TIO$_2$ Content (wt %) | Pencil Hardness Rating |
|---|---|
| 5 or less | B |
| 5~10 | HB |
| 10~15 | 2H |
| 15~20 | 2H |
| 20~25 | 4H |

Accordingly, it may be appreciated that when the weight content of TIO$_2$ is 10 to 15% which is a range of various embodiments of the present invention, a pencil hardness rating is 2H, exhibiting sufficient hardness.

In the related art, SiC, etc., are added to an acrylic resin to improve scratch resistance. However, when TiO$_2$ is added, there is a disadvantage in that TiO$_2$ is agglomerated, which makes the coating solution opaque. In the present invention, the epoxy resin is added to the acrylic resin to improve degree of dispersion of TiO$_2$, such that a transparent coating solution may be maintained.

FIGS. 3A-3D illustrates results of a viscosity test depending on the addition amount of the epoxy resin. In the test, time for completely leaving the coating solution full in a cup by 100% is measured several times by DIN4 viscosity measurement, and when a variation in the measured time is within 5 seconds, it is determined that TiO$_2$ is well dispersed.

Figure 3A:
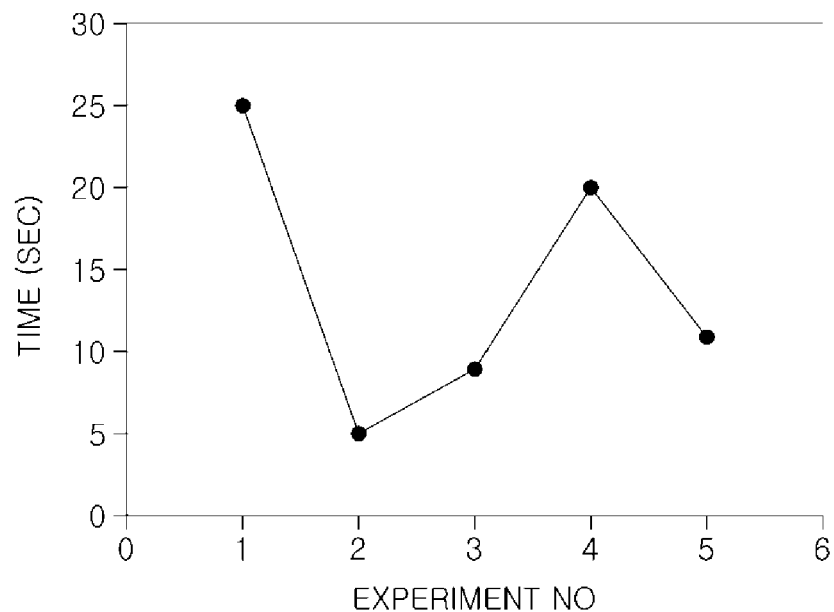
FIG. 3A, FIG. 3B, FIG. 3C, and FIG. 3D are graphs illustrating measurement results of viscosity deviation for each content of an epoxy resin.
Figure 3B:
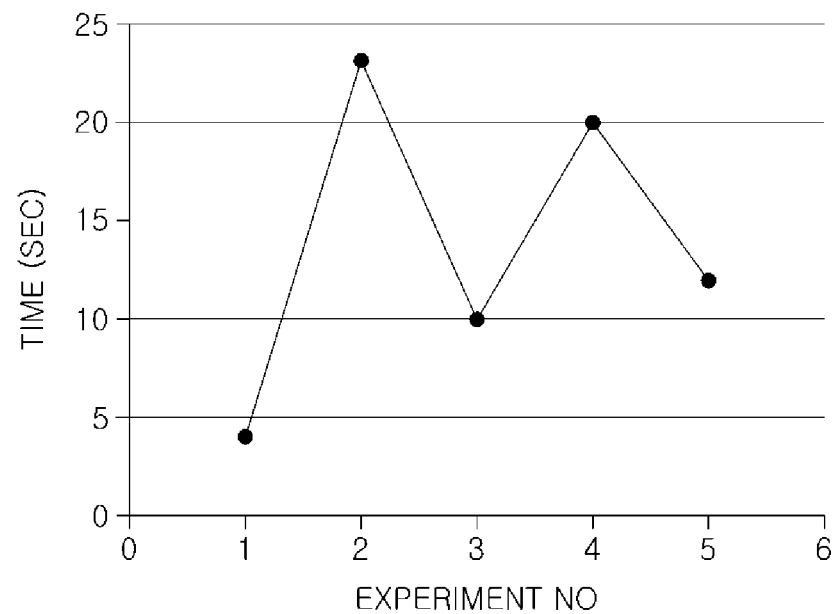
Figure 3C:
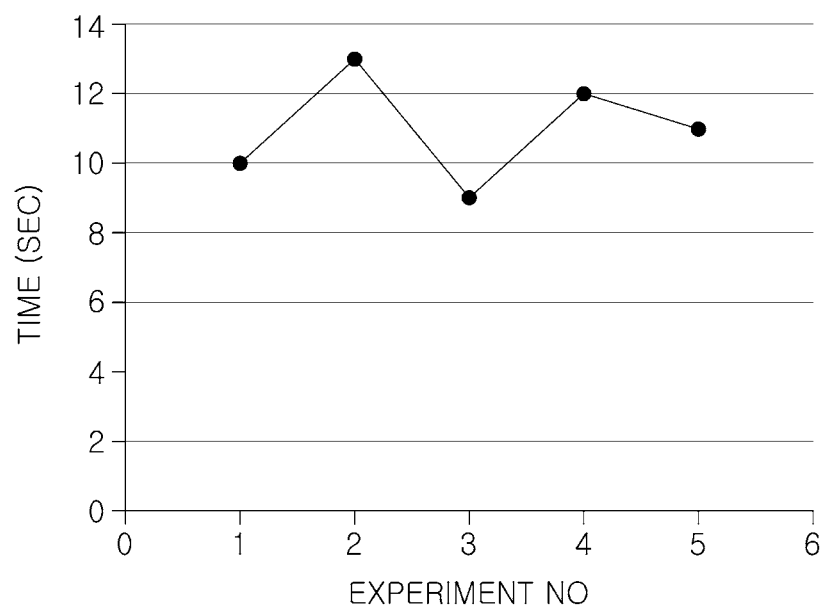
Figure 3D:
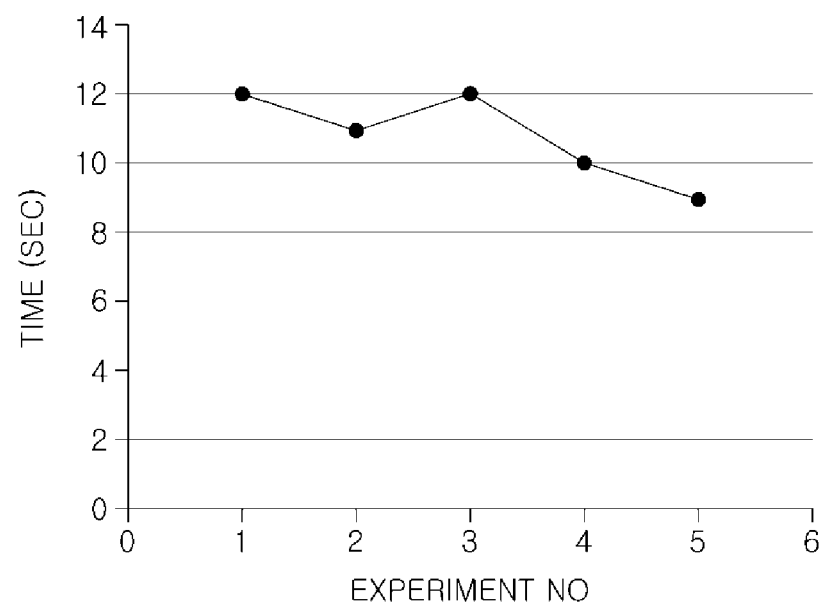
Figure 4:
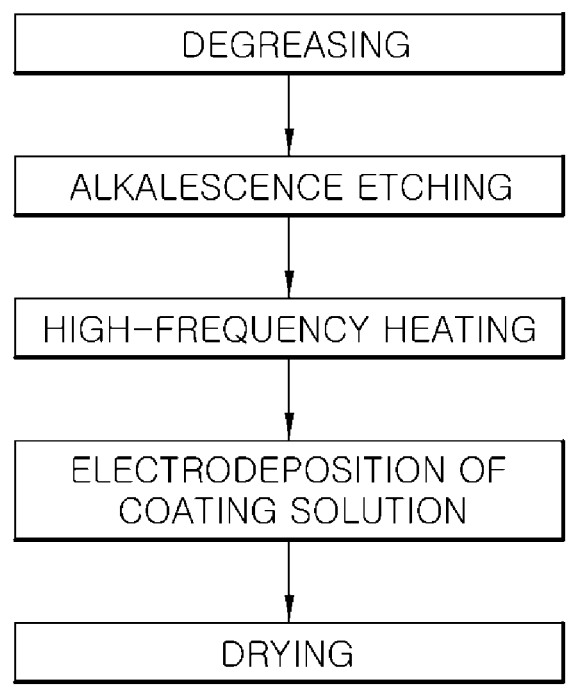
FIG. 4 is a flow chart illustrating a manufacturing method of the clad steel coated by the electrodeposition according to various embodiments of the present invention.

FIGS. 3A and 3D illustrate viscosity measurement results obtained by controlling the content of the epoxy resin while fixing the weight content of TiO$_2$ to 10 wt %. FIG. 3A illustrates a case where epoxy of 0 wt % is added, FIG. 3B illustrates a case where the epoxy of 5 wt % is added, FIG. 3C illustrates a case where the epoxy of 10 wt % is added, and FIG. 3D illustrates a case where the epoxy of 15 wt % is added.

Here, for remaining components except for the contents of TiO$_2$ and the epoxy resin, on the basis that acrylic resin: 45%, melamine curing agent: 15%, aromatic solvent: 7%, cyclohexanone: 12%, the contents of the acrylic resin and the melamine curing agent are changed depending on a change in content of the epoxy resin.

FIG. 3A illustrates a case where epoxy is not added at all, and it may be appreciated that when measuring viscosity, time deviation is the maximum of 20 seconds, such that the degree of dispersion is significantly low.

As illustrated in FIG. 3B, it may be appreciated that as the content of epoxy is increased, the degree of dispersion is improved, and the time deviation is reduced, and when measuring the viscosity, the time deviation is still more than 5 seconds, such that the degree of dispersion is not good.

FIGS. 3C and 3C illustrate examples of various embodiments of the present invention, and it may be appreciated that since the content of the epoxy satisfies the limitation range of the present invention, the degree of dispersion is improved, such that when measuring the viscosity, the time deviation is within 5 seconds.

As described above, various embodiments of the present invention provide a transparent coating solution capable of exhibiting high hardness and scratch resistance by the acrylic resin and TiO$_2$, and improving dispersibility of TiO$_2$ by adding the epoxy resin.

In the degreasing, it is exemplary that the clad steel is cathodically degreased in 25 to 35 g/l of trisodium phosphate (Na$_3$PO$_4$) aqueous solution for 30 seconds to 3 minutes under conditions in which a current density is 1 to 4 A/dm and a voltage is 4 to 6V.

The electrolytic degreasing may reduce time for degreasing as compared to general alkaline degreasing, and may degrease even fine oil.

When time for degreasing, the current density, and the voltage are less than the limitation range of the present invention, degreasing may not be sufficient, and when the time for degreasing, the current density, and the voltage are more than the limitation range of the present invention, corrosion of the clad steel beyond the greasing may occur.

In the etching, it is exemplary that the clad steel is immersed in an aqueous solution including 100 to 200 g/l of ammonium hydroxide (NH$_4$OH) and 50 to 200 g/l of potassium hydrogen phthalate (KHP) for 3 to 5 minutes to be etched, and a temperature at the time of the etching is 20 to 30° C.

An etching solution used for this step is alkalescent (pH 8 to 9), and has a property in which aluminum and stainless steel are simultaneously capable of being etched.

Generally, an alkaline etching solution is used for aluminum and an acid etching solution is used for the stainless steel. The alkalescence etching solution is used to etch the clad steel including aluminum and stainless steel at a time.

The stainless steel is favorably etched in an acidic environment, but is etched even in an alkaline environment, and aluminum is etched only in the alkaline environment. Therefore, it is required to perform an etching process in the alkaline environment so as to simultaneously etch both materials, stainless steel and aluminum.

When etching in the acidic environment, aluminum is hardly etched, but the stainless steel is only etched regardless whether it is pH of a weak acid or pH of a strong acid.

In addition, despite the alkaline environment, when the etching is performed in strong alkaline environment, aluminum is excessively etched as compared to the stainless steel.

Therefore, in order to simultaneously etch the stainless steel-aluminum clad material, it is required to use the alkalescence etching solution.

If the etching is performed in the acidic environment, such that only the stainless steel is etched, the attachment property between the stainless steel and the coating solution is deteriorated. Accordingly, moisture and other foreign materials are permeated between the stainless steel and the coating layer, such that red rust occurs, etc., which deteriorates corrosion resistance.

In the heating, it is exemplary that the clad steel is heated at 100 to 200° C. for 2 to 3 minutes by using high frequency heating.

Through the heating, attachment property between the coating solution and the clad steel may be improved in a subsequent coating process.

In the performing of the electrodeposition, it is exemplary that the clad steel is immersed in the coating solution, and then, a voltage of 10 to 20V is applied at 40 to 50° C. for 1 to 5 minutes to electrodeposit the coating solution on the clad steel.

As compared to roll-coating according to the related art, when the coating method in the immersion electrodeposition manner is used, there is advantage in that the coating layer is capable of being uniformly formed on entire surfaces of the clad steel. In the clad steel, particularly, a biomaterial bonding part is exposed, which may be vulnerable to corrosion, such that it is preferable to minimize an exposed part of the metal, thereby preventing corrosion. Therefore, it is exemplary to use the coating method in the immersion electrodeposition manner rather than the roll-coating manner.

When an electrodeposition temperature and voltage are low, attachment force of the coating solution is weak or an amount of the coating solution to be attached is reduced, such that scratch resistance and corrosion resistance may be deteriorated.

On the contrary, when the electrodeposition temperature and voltage are high, the thickness of the coating layer may be excessively thick, and the coating solution may be vaporized and scattered due to explosive reaction caused by high voltage.

Therefore, when the electrodeposition temperature and voltage are limited to the above-described range, and the electrodeposition coating is performed under these temperature and voltage conditions for 1 to 5 minutes, the coating layer may be formed with the most exemplary thickness and appearance.

The coating solution applied for the coating method for a clad steel as described above is a solution including in percent by weight (wt %), acrylic resin of 40 to 50%, $TiO_2$ of 10 to 15%, epoxy resin of 10 to 15%, melamine curing agent of 10 to 20%, aromatic solvent of 5 to 10%, and cyclohexanone of 10 to 15%. Since the coating solution is described in detail in the above-described coating method, details thereof are omitted herein.

The coating method for a clad steel and the coating solution for coating the clad steel according to various embodiments of the present invention have advantageous effects as follows.

First, scratch resistance may be improved by using the coating solution based on an acrylic resin having high durability. Second, corrosion resistance may be improved by preventing exposure of the bimaterial interface of the clad steel. Third, the coating solution may be maintained transparently by evenly dispersing $TiO_2$ powder using an epoxy resin. Fourth, a bonding force in which the coating solution is attached onto the stainless steel-aluminum may be improved through alkalescence etching.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coating method for a clad steel in which stainless sheets are combined on adjacent surfaces of an aluminum sheet, the method comprising:
   preparing the clad steel;
   preparing a coating solution in which an epoxy resin and titanium dioxide ($TiO_2$) powder are combined in an acrylic resin;
   etching the clad steel to improve adhesion property between the coating solution and the clad steel;
   heating the clad steel; and
   performing electrodeposition by immersing the clad steel in the coating solution,
   wherein in the preparing of the coating solution, the coating solution is prepared including in percent by weight (wt %), acrylic resin of 40 to 50%, $TiO_2$ of 10 to 15%, epoxy resin of 10 to 15%, melamine curing agent of 10 to 20%, aromatic solvent of 5 to 10%, and cyclohexanone of 10 to 15%.

2. The coating method of claim 1, further comprising degreasing the clad steel between the preparing of the clad steel and the etching of the clad steel.

3. The coating method of claim 2, wherein in the degreasing of the clad steel, the clad steel is cathodically degreased in 25 to 35 g/l of trisodium phosphate ($Na_3PO_4$) aqueous solution for a time period of 30 seconds to 3 minutes under conditions in which a current density is 1 to 4 A/dm and a voltage is 4 to 6V.

4. The coating method of claim 1, wherein in the etching of the clad steel, the clad steel is immersed in an aqueous solution including 100 to 200 g/l of ammonium hydroxide ($NH_4OH$) and 50 to 200 g/l of potassium hydrogen phthalate (KHP) for 3 to 5 minutes to be etched, and a temperature at a time of the etching is 20 to 30° C.

5. The coating method of claim 1, wherein in the heating of the clad steel, the clad steel is heated at 100 to 200° C. for a time period of 2 to 3 minutes.

6. The coating method of claim 1, wherein in the performing of the electrodeposition, the clad steel is immersed in the coating solution, and then, a voltage of 10 to 20V is applied at 40 to 50° C. for a time period of 1 to 5 minutes to electrodeposit the coating solution on the clad steel.

7. The coating method of claim 1, further comprising drying at 80 to 100° C. for 10 to 20 minutes after the performing of the electrodeposition.

* * * * *